United States Patent [19]
Takeda et al.

[11] Patent Number: 6,024,187
[45] Date of Patent: Feb. 15, 2000

[54] APPARATUS FOR DETECTING ANOMALY OF YAW RATE SENSOR, AND VEHICLE EQUIPPED THEREWITH

[75] Inventors: Osamu Takeda, Susono; Kozo Fujita, Aichi-ken, both of Japan

[73] Assignee: Toyota Jidosha Kabushiki Kaisha, Toyota, Japan

[21] Appl. No.: 09/105,036

[22] Filed: Jun. 26, 1998

[30] Foreign Application Priority Data

Aug. 22, 1997 [JP] Japan ..................................... 9-226447

[51] Int. Cl.[7] .................................................. G01M 17/00
[52] U.S. Cl. ............................... 180/408; 701/34; 701/43
[58] Field of Search ................................. 701/92, 43, 41, 701/29, 34; 180/408, 412, 416

[56] References Cited

U.S. PATENT DOCUMENTS

| | | | |
|---|---|---|---|
| 5,212,640 | 5/1993 | Matsuda .................................. | 180/197 |
| 5,212,642 | 5/1993 | Tanaka et al. ............................. | 701/41 |
| 5,251,136 | 10/1993 | Fukuyama et al. ...................... | 280/707 |
| 5,457,632 | 10/1995 | Tagawa et al. ........................... | 180/141 |
| 5,866,796 | 2/1999 | Chia et al. ................................. | 73/1.75 |

FOREIGN PATENT DOCUMENTS

A-4-135980  5/1992  Japan .

*Primary Examiner*—Kevin Hurley
*Assistant Examiner*—Avraham H. Lerner
*Attorney, Agent, or Firm*—Oliff & Berridge, PLC

[57] ABSTRACT

A yaw-rate-sensor's anomaly detecting apparatus of the invention comprises a road-surface-condition determining device for determining a road surface condition and a yaw-rate-sensor's anomaly determining device for determining that a yaw rate sensor is abnormal, when a change amount of yaw rate outputted from the yaw rate sensor exceeds an anomaly determination threshold, wherein the yaw-rate-sensor's anomaly determining device sets one of different anomaly determination thresholds varying according to determination results by the road-surface-condition determining device. This can suppress erroneous determination of anomaly of the yaw rate sensor due to running on a bad road.

8 Claims, 7 Drawing Sheets

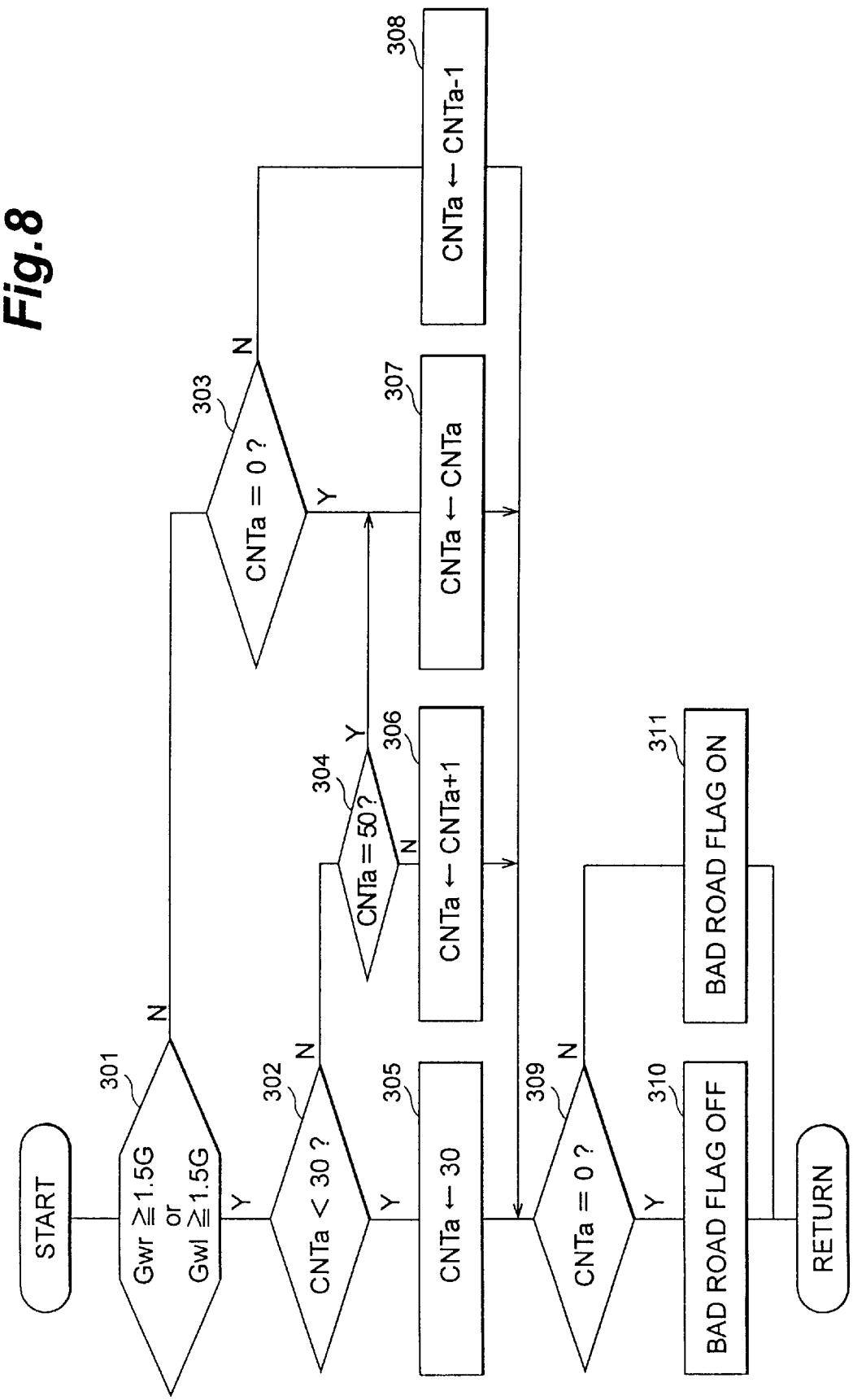

APPARATUS FOR DETECTING ANOMALY OF YAW RATE SENSOR, AND VEHICLE EQUIPPED THEREWITH

BACKGROUND OF THE INVENTION

1. Field of the Invention

The present invention relates to a vehicle provided with a yaw rate sensor and an apparatus for detecting an anomaly of a yaw rate sensor used in this vehicle.

2. Related Background Art

Vehicle control such as rear wheel steering control or vehicle posture control often utilizes a yaw rate obtained by the yaw rate sensor, as one of control parameters. In such control, if the yaw rate sensor is abnormal and if it is neglected, false vehicle control will result naturally. It is, therefore, necessary to monitor the status of the yaw rate sensor and to perform some operation to handle an anomaly if any.

As an apparatus of this type for monitoring the status of the yaw rate sensor there is an apparatus for detecting an anomaly of the yaw rate sensor.

Japanese Laid-open Patent Application No. Hei 4-135980 discloses the invention of four wheel steering apparatus, in which there is the description about the anomaly detecting apparatus for yaw rate sensor arranged to make a decision that the yaw rate sensor is abnormal, when a change rate of yaw rate exceeds a predetermined value.

In this conventional anomaly detecting apparatus for yaw rate sensor, however, road surface conditions are not taken into consideration in the decision on the anomaly of yaw rate sensor, and it is presumed that a threshold value for the decision on the anomaly is set on the premise that the vehicle runs under ordinary road surface conditions.

During running on a bad road, however, vibration of vehicle is superimposed on values of yaw rate detected by the yaw rate sensor, so that change rates of yaw rate sometimes become large values that would never appear during running on a good road.

When the threshold value for the decision on the anomaly is set on the premise that the vehicle runs on a good road, it is highly probable that an erroneous decision of anomaly is made during running on a bad road.

SUMMARY OF THE INVENTION

The anomaly detecting apparatus for yaw rate sensor according to the present invention solved this problem and is provided as an apparatus comprising road-surface-condition determining means for determining a road surface condition, and yaw-rate-sensor's anomaly determining means for determining that a yaw rate sensor is abnormal, when a change amount of yaw rate outputted from the yaw rate sensor exceeds an anomaly determination threshold value, wherein the yaw-rate-sensor's anomaly determining means sets one of different anomaly determination threshold values according to determination results of the road-surface-condition determining means.

When the road-surface-condition determining means makes the determination that the road surface condition is of a bad road, the yaw-rate-sensor's anomaly determining means sets a high anomaly determination threshold value. This will make it hard for the change amount of yaw rate to exceed the anomaly determination threshold value, even if the change amount of yaw rate becomes great because of the vibration of vehicle during running on a bad road. Therefore, false detection of anomaly of yaw rate sensor can be suppressed. Conversely, during running on a good road the anomaly determination threshold value is set to be a relatively low value suitable for the good road, so that no failure occurs in the detection of anomaly.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 8 is a flowchart to show a road-surface-condition determining process executed by ECU 1.

DESCRIPTION OF THE PREFERRED EMBODIMENTS

Figure 1:
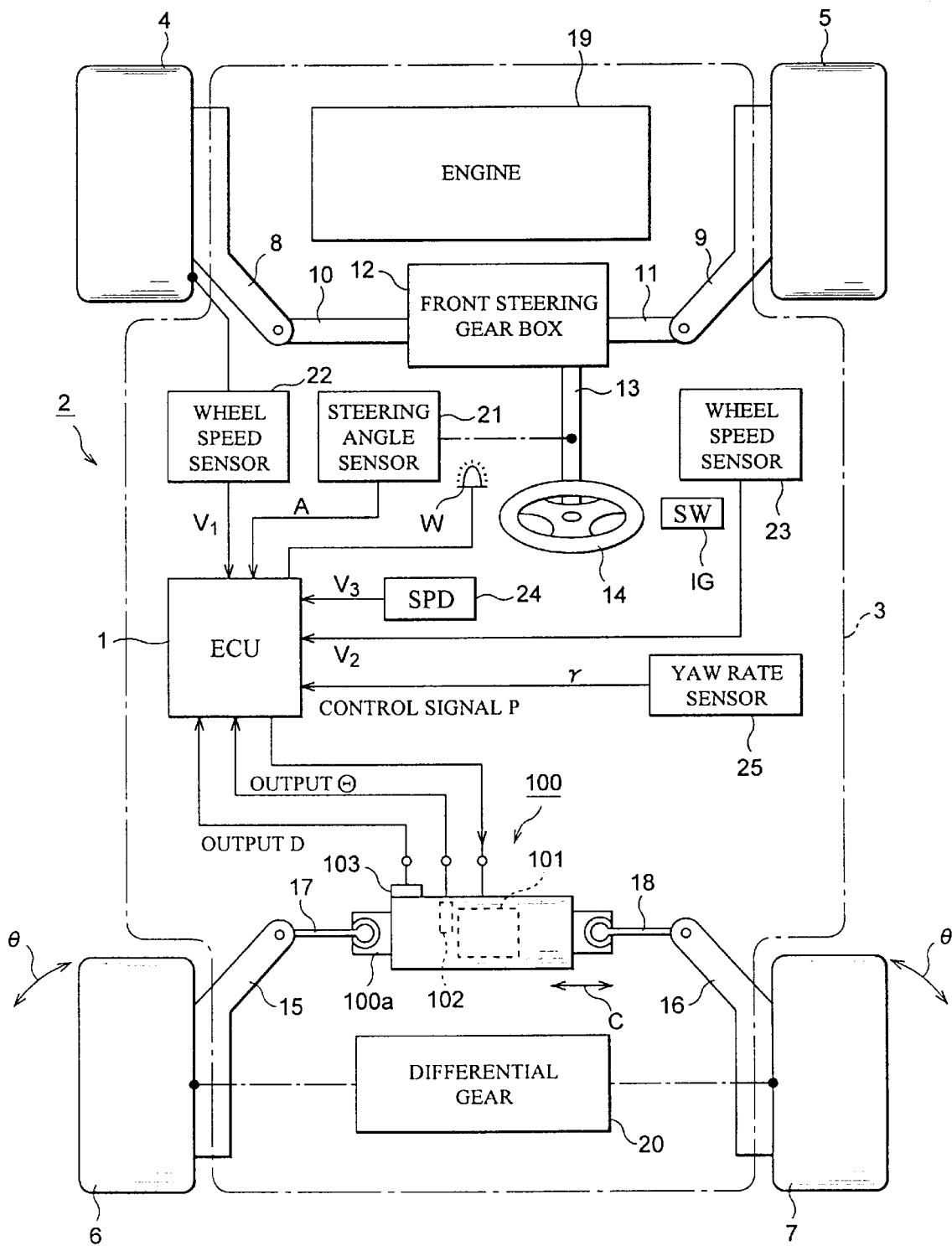
FIG. 1 is a diagram to show a system configuration of a vehicle provided with the anomaly detecting apparatus for yaw rate sensor as an embodiment of the present invention.

FIG. 1 is a diagram to show a system configuration of a vehicle equipped with an anomaly detecting apparatus for yaw rate sensor as an embodiment of the present invention. This vehicle uses the yaw rate detected by the yaw rate sensor, as one of parameters for the rear wheel steering control, and is equipped with the yaw-rate-sensor's anomaly detecting apparatus for detecting an anomaly of this yaw rate sensor.

The overall system of the vehicle will be described first. This vehicle 2 has front wheels 4, 5 and rear wheels 6, 7 attached to body 3. The front wheels 4, 5 are mechanically coupled with front steering gear box 12 through knuckle arm 8, 9 and tie rod 10, 11, respectively.

The gear box 12 is coupled with steering wheel 14 through shaft 13 capable of rotating about the axis thereof. When the shaft 13 rotates about its axis, a rack in the gear box 12 moves along its longitudinal direction with receiving auxiliary force from a motor, a hydraulic mechanism, or the like, according to the rotation of the shaft 13, and the tie rods 10, 11 engaging the rack move along the longitudinal direction.

Since the shaft 13 rotates according to rotation of the steering wheel 14, the tie rods 10, 11, coupled through a hinge with the knuckle arms 8, 9, move along their longitudinal direction with rotation of the steering wheel 14, so as to change the steering angle of the front wheels 4, 5.

The rear wheels 6, 7 are coupled through knuckle arm 15, 16 and tie rod 17, 18 with the both ends of rear wheel driving shaft 100a of actuator 100 for rear wheel steering. The actuator 100 (driving means) has a reduction gear mechanism coupled with motor body 101 inside. When the rear wheel driving shaft 100a linked to this reduction gear mechanism moves along its longitudinal direction (indicated by arrow C), the rear wheels 6, 7 are turned in the directions indicated by arrow θ in the same manner as the front wheels 4, 5.

The actuator 100 is composed of a motor body 101, a rotational position sensor 102 consisting of three magnetic pole sensors disposed on the motor body 101, for outputting a rotational position signal Θ according to a rotational position of a rotor of the motor body 101, and a neutral sensor 103 for outputting a discriminant signal D to indicate whether a real steering angle δr of the rear wheels 6, 7 is right or left with respect to the neutral steering angle δr₀.

Figure 2:
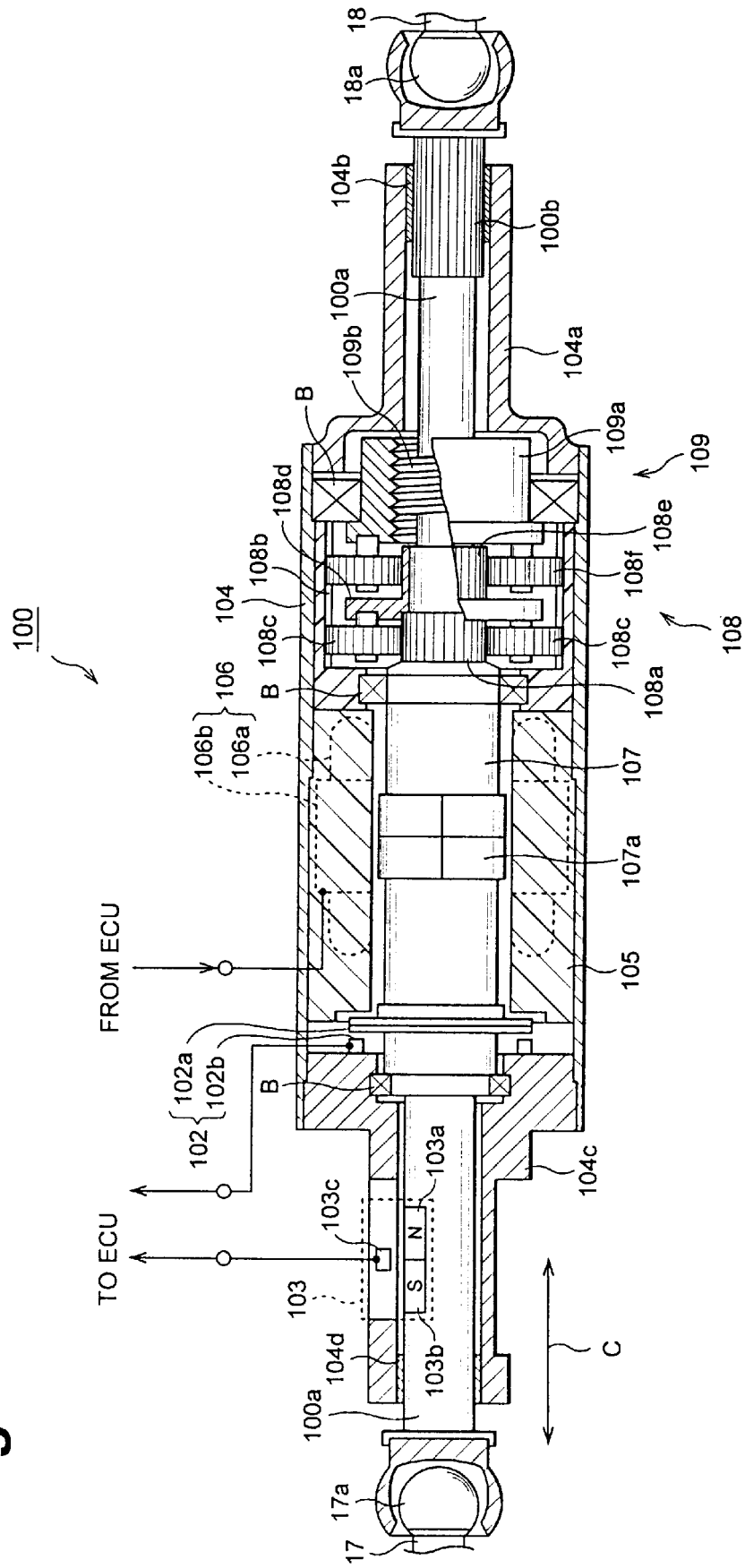
FIG. 2 is a sectional view to show the structure of rear wheel steering and driving mechanism 100 used in rear wheel angle control.

The internal structure of the actuator 100 will be described next referring to FIG. 2. FIG. 2 is a sectional view of the actuator 100, taken along the longitudinal direction of the shaft 100a. This actuator 100 is comprised of a cylindrical housing 104 made of metal, a motor body 101 of an inner rotor type which is composed of a stator 106 fixed to the internal wall of housing 104 by plastic member 105 and a rotor 107 placed inside the stator 106, a reduction gear mechanism 108 for reducing rotational speed of the rotor 107 to transmit torque, and a converting mechanism 109 for converting rotational motion of the reducing gear mechanism 108 to linear motion along the longitudinal direction C to transmit the linear motion to the driving shaft 100a.

When the rotor 107 rotates, the torque is transmitted through the reduction gear mechanism 108 and converting mechanism 109 to the driving shaft 100a, so that the driving shaft 100a moves along the longitudinal direction C. Since the actuator-side end 17a, 18a of the tie rods 17, 18 is linked through a ball joint with either end of the driving shaft 100a, the rear wheels 6, 7 are turned with rotation of the rotor 107.

The reduction gear mechanism 108 has a first planetary gear mechanism consisting of a sun gear 108a fixed to the end of the rotor 107 serving as a driving shaft, a stationary internal gear 108b made of a resin stuck on the internal surface of housing 104, and a plurality of planetary gears 108c interposed between the sun gear 108a and the stationary internal gear 108b.

The reduction gear mechanism 108 further has a second planetary gear mechanism consisting of the stationary internal gear 108b shared with the first planetary gear mechanism, a sun gear 108e serving as a driving shaft and placed coaxially with the sun gear 108a of the first planetary gear mechanism, and a plurality of planetary gears 108f interposed between the sun gear 108e and the stationary internal gear 108b.

Rotary shafts of the planetary gears 108c of the first planetary gear mechanism are rotatably supported each at the tip of arm 108d fixed to the driving shaft 108e of the second planetary gear mechanism, and the driving shaft 108e of the second planetary gear mechanism composes a driven shaft of the first planetary gear mechanism. When the rotor 107 is rotated to rotate the sun gear 108a of the first planetary gear mechanism, the planetary gears 108c in mesh with the sun gear 108a and stationary internal gear 108b revolve around the sun gear 108a, and the driving shaft 108e of the second planetary gear mechanism, which is fixed at the base end of the arm 108d supporting the planetary gears 108c, rotates coaxially with the sun gear 108a. When the driving shaft 108e of the second planetary gear mechanism rotates, a nut 109a of the converting mechanism 109 as a driven shaft of the second planetary gear mechanism rotates coaxially with the driving shaft 108e in the same manner as in the case of the first planetary gear mechanism.

The converting mechanism 109 is composed of the nut 109a having thread grooves formed in the internal surface thereof, and a screw 109b in mesh with the thread grooves. A cylindrical communicating member 104a fixed to the housing 104 has keys 104b extending along the longitudinal direction C on the internal surface thereof, and one end of the driving shaft 100a located in the cylindrical member 104a has grooves 100b extending along the longitudinal direction C.

The grooves 100b of the driving shaft 100a and the keys 104b of the cylindrical member 104a are in mesh with each other to compose the spline structure, thereby limiting rotation of the driving shaft 100a about the axis thereof. The rotor 107 and nut 109a are supported inside the housing 104 by ball bearing B, so as to be rotatable relative to the housing 104. The driving shaft 100a extends through hollow portions of the respective cylindrical member 104a at the right end, nut 109a, sun gears 108e, 108a, rotor 107, and support member 104d fixed on the internal surface of cylindrical member 104c of the left end, so that it can move along the longitudinal direction C relative to the housing 104.

Since the spline structure restrains the driving shaft 100a from rotating, when the nut 109 rotates about the axis of the driving shaft 100a with rotation of the rotor 107, the screw 109b of the converting mechanism 109 forming a part of the driving shaft 100a moves along the longitudinal direction C of the driving shaft 100a, thereby turning the rear wheels 6, 7.

The rotor 107 has a magnet 107a surrounding the outer surface thereof in the circumferential direction and the stator 106 surrounding the rotor 107 has a laminated core 106a of iron, and a winding 106b. The winding 106b is a wire wound around the laminated core 106a located opposite the magnet 107a. When the control current P is supplied from ECU 1 to the winding 106b, the rotor 107 rotates relative to the stator 106. At least a part of the stator 106 is embedded in the plastic member 105 containing glass fibers.

The rotational position of the rotor 107 is detected by the rotational position sensor 102 composed of a magnet 102a fixed to one end of the rotor, and a Hall element 102b. The magnet 102a and Hall element 102b are positioned in a non-contact state so as to provide different output signals according to rotational positions of the rotor 107. Based on information of rotational position of the rotor 107, detected by the rotational position sensor 102, the ECU 1 supplies the control current P to the stator 106 to rotate the rotor 107. Namely, the motor used in this actuator 100 is a revolving-field type DC brushless motor for detecting the rotational position of the rotor 107 in the non-contact manner and supplying the control current P to the stator 106.

The neutral sensor 103 detects the approximate position of the driving shaft 100a in the longitudinal direction C. Specifically, the neutral sensor 103 is comprised of N-pole area 103a and S-pole area 103b made by magnetizing parts of the surface of the rearwheel driving shaft 10a, and a Hall element 103c fixed opposite to the magnetized areas 103a, 103b. The N-pole area 103a and S-pole area 103b are aligned along the moving direction C of the rear-wheel driving shaft 100a, i.e., along the longitudinal direction C of the rear-wheel driving shaft 100a.

The rear wheels 6, 7 turned by this actuator 100 are driving wheels rotated by the driving force of engine 19 placed in the body 3, and the driving force from the engine 19 is transmitted through a propeller shaft, not illustrated, and through a differential gear 20 to the rear wheels 6, 7. The engine 19 is started when the ignition switch IG provided inside the body 3 is turned on.

This vehicle 2 has a steering wheel angle sensor 21 for outputting a rotational angle signal A of the steering wheel 14 corresponding to a front-wheel steering angle δf, wheel speed sensors 22, 23 for outputting wheel speed signals v1, v2, respectively, corresponding to the wheel speeds of the front wheels 4, 5, a speed sensor 24 for outputting a wheel speed signal v3 corresponding to a wheel speed of the driving wheels 6, 7, and a yaw rate sensor 25 for outputting a yaw rate γ corresponding to an angular velocity in the yawing directions of the vehicle. The vehicle speed v of the vehicle 2 is either one of the wheel speed signals v1, v2, v3, an average thereof, or one obtained by weighting on the signals v1, v2, v3.

The electronic circuit unit (ECU) 1 mounted on the vehicle 2 receives vehicle status information including the outputs from the respective sensors 21 to 25, 102, 103 and on/off information of the ignition switch IG described above. The ECU 1 drives the actuator 100 according to the input vehicle status information to control turning of the rear wheels 6, 7.

The rear wheel angle controlling apparatus has the sensors 21 to 25, 102, 103 for supplying the vehicle status information to the ECU 1, and the ECU 1 for controlling the actuator 100 according to the input information from these sensors. The ECU 1 calculates the rear wheel target angle δr* by which the rear wheels 6, 7 should be turned, according to the input vehicle status information, and controls the actuator 100 so that the real angle δr of the rear wheels 6, 7 agrees with the rear wheel target angle δr* thus calculated.

The rear wheel target angle δr* is obtained based on the following equation.

$$\delta r = K1 \cdot \delta f + K2 \cdot \gamma \qquad (1)$$

Figure 3:
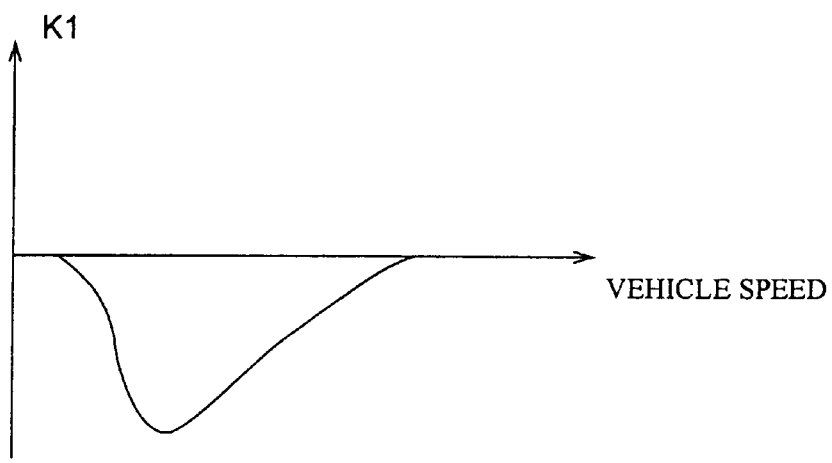
FIG. 3 is a graph to show coefficient K1 in a formula for calculating a target angle, used in rear wheel angle control.
Figure 4:
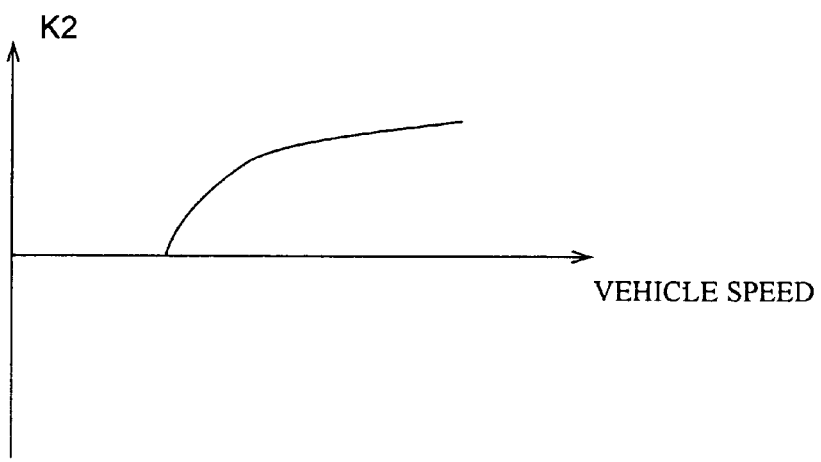
FIG. 4 is a graph to show coefficient K2 in the formula for calculating a target angle, used in rear wheel angle control.

In this equation, K1 and K2 are coefficients varying depending upon the vehicle speed (the velocity of the vehicle) and relations thereof with the vehicle speed are shown in FIG. 3 and FIG. 4, respectively. δf is a front wheel turned angle.

The rear wheel target angle δr* is determined based on Eq. (2) below when there is an anomaly in the yaw rate sensor 25; it is also determined based on Eq. (3) when there is an anomaly in the steering angle sensor 21.

$$\delta r^* = K1' \cdot \delta f \qquad (2)$$

$$\delta r^* = K2' \cdot \gamma \qquad (3)$$

Figure 5:
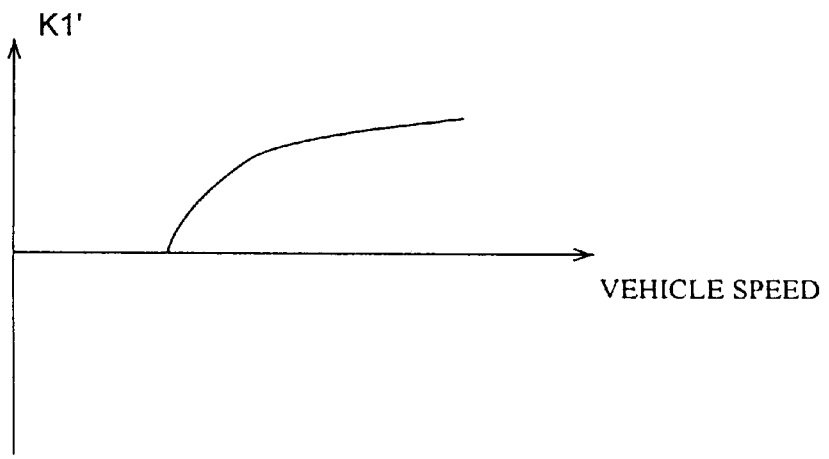
FIG. 5 is a graph to show coefficient K1' in a formula for calculating a target angle, used in rear wheel angle control.
Figure 6:
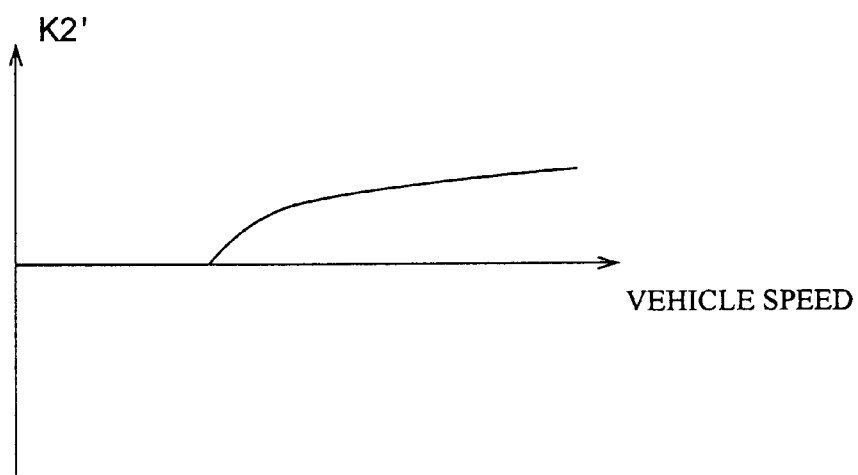
FIG. 6 is a graph to show coefficient K2' in a formula for calculating a target angle, used in rear wheel angle control.

In these equations K1' and K2' are also coefficients varying according to the vehicle speed, similar to K1 and K2, and relations thereof with the vehicle speed are shown in FIG. 5 and FIG. 6, respectively.

Figure 7:
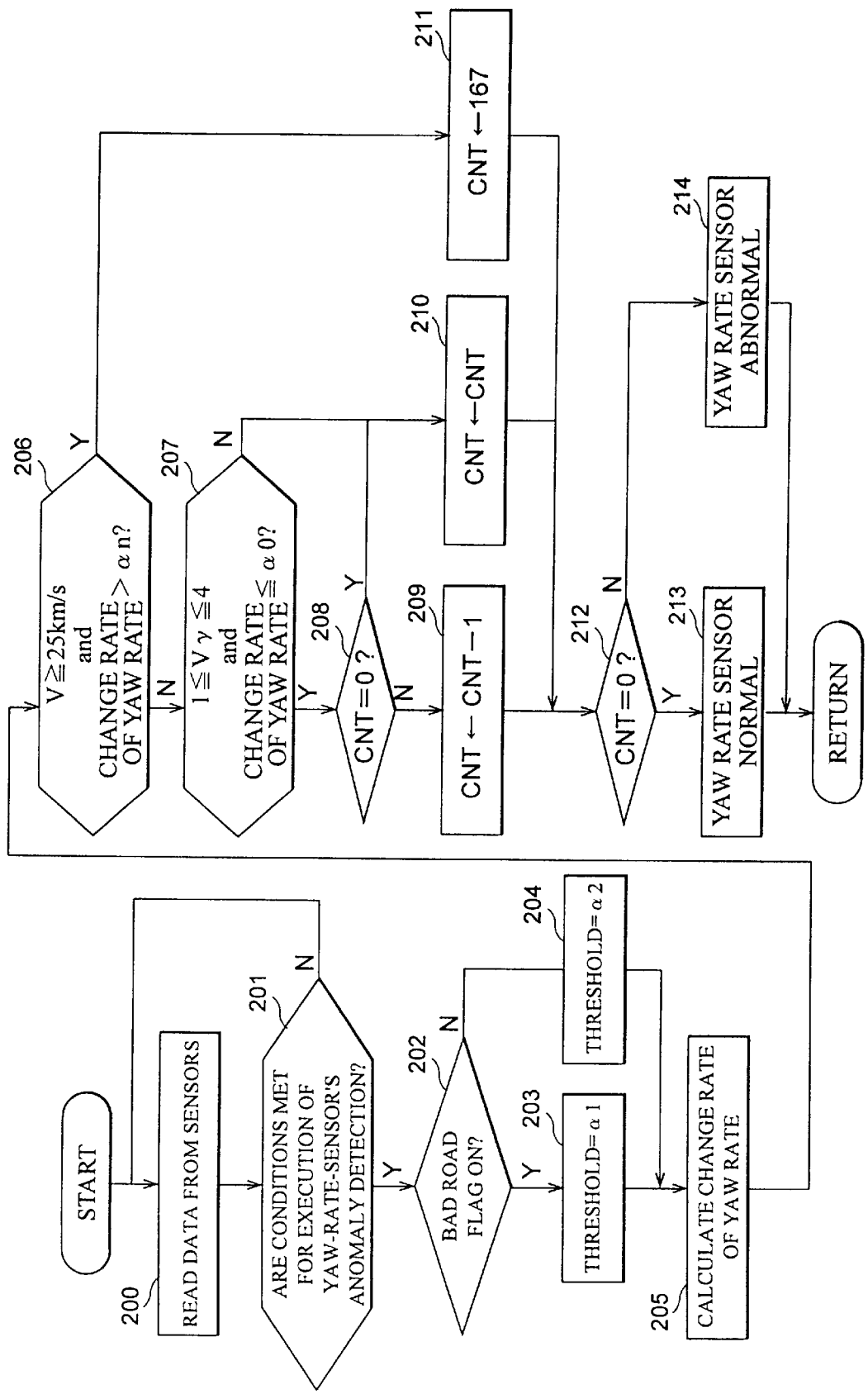
FIG. 7 is a flowchart to show a yaw-rate-sensor's anomaly detecting process executed by ECU 1.

The yaw-rate-sensor's anomaly detecting apparatus of the present embodiment will be described next. The function of the yaw-rate-sensor's anomaly detecting apparatus is a function of the ECU 1, which is achieved when the ECU 1 carries out the flowcharts shown in FIG. 7 and FIG. 8. FIG. 7 illustrates the main flowchart for detection of anomaly of the yaw rate sensor and FIG. 8 illustrates the flowchart of the road-surface-condition determining process necessary for detection of anomaly of the yaw rate sensor.

The yaw-rate-sensor's anomaly detecting process routine shown in FIG. 7 is executed every 6 ms by the ECU 1.

In step 200 the vehicle status information obtained from the various sensors is first read. In step 201 a decision is then made about whether execution conditions for execution of the yaw-rate-sensor's anomaly detecting process are met. The execution conditions are the following two conditions; the power-supply voltage to the yaw rate sensor 25 is normal and two seconds have elapsed after start of the engine, i.e., after on of IG signal.

When these execution conditions are met, the ECU moves to step 202 to determine whether a bad road determination flag is on. Setting of status of the bad road determination flag is carried out according to the road-surface-condition determination flowchart shown in FIG. 8. When the running road is determined to be a bad road, the bad road determination flag is set on; when it is a good road, the flag is off. The road-surface-condition determination process will be described hereinafter in detail.

When in this determination step 202 the determination is made that the bad road determination flag is off, the ECU advances to step 203 to set an anomaly determination threshold to α1; when the flag is determined to be on, the ECU moves to step 204 to set the anomaly determination threshold to α2, which is a larger value than α1. In the present embodiment α1=100 deg/s² and α2=500 deg/s².

After the anomaly determination threshold is set in step 203 or 204, the ECU advances to step 205 to calculate a change rate of yaw rate. The change rate of yaw rate is obtained by subtracting a yaw rate value γ (n−1) in a preceding measurement, i.e., a value measured 6 ms before, from a yaw rate value γ (n) measured this time, and dividing an absolute value of the result by 6 ms.

Then the ECU proceeds to step 206 to carry out determination of anomaly of the yaw rate sensor 25. Specifically, a decision is made as to whether the change rate of yaw rate calculated in step 205 is greater than the anomaly determination threshold an. The anomaly determination threshold an this time depends upon the status of the bad road determination flag determined in step 202, and is either α1 or α2. The premise for this decision is that the vehicle speed v satisfies the condition of v≧25 km/s. When the both conditions are satisfied, the decision is made that the yaw rate sensor 25 is abnormal, and the ECU moves to step 211. In step 211 the ECU sets a value of fail counter CNT for indicating an anomaly of the yaw rate sensor 25 to 167.

When the conditions are not met in step 206, that is, when it is not granted that there is an anomaly in the yaw rate sensor, the ECU moves to step 207 to make a decision as to whether the yaw rate sensor is normal. Namely, it is determined whether the change rate of yaw rate calculated in step 205 is not more than a normality determination threshold α0, which was preliminarily set. The threshold α0 is smaller than α1 and α2 and in this example α0=50 deg/s².

The premise for this normality determination is that the output from the yaw rate sensor 25 is within a predetermined range. The yaw rate sensor 25 outputs voltages ranging from 0.5 to 4.5 V around the center of 2.5 V and the output voltages Vγ are linear to yaw rates from −40 to +40 deg/s. The yaw rate at 2.5 V is zero. From the idea that in this yaw-rate-sensor's normality determination process the normality determination should be carried out in the range excluding extremely large yaw rates, the premise for this process is that the output voltages Vγ from the yaw rate sensor 25 should be within the range of 1 to 4 V.

When the answer is negative in the normality determination of step 207, it cannot be determined whether the yaw rate sensor 25 is either normal or abnormal, and the ECU proceeds to step 210 to maintain the previous value of the fail counter CNT as it is.

When the answer is positive in the normality determination of step 207, the ECU proceeds to step 208 to determine whether the value of fail counter CNT is 0. If it is 0, the ECU will proceed to step 210 to maintain the count value 0 as it is; if not 0 the ECU will proceed to step 209 to replace the value of fail counter CNT with a value obtained by subtracting 1 from the previous value.

After the fail counter setting process is carried out in either of steps 209 to 211, the ECU moves to step 212. In this step a decision is made as to whether fail counter CNT=0. When the value of fail counter CNT is 0, the ECU goes to step 213 to determine that the yaw rate sensor 25 is normal. If the value of fail counter CNT is not 0, the ECU goes to step 214 to determine that the yaw rate sensor 25 is abnormal.

The following expresses the whole of the yaw-rate-sensor's anomaly determination process from step 205 to step 214.

The process shown in this flowchart is repetitively carried out every 6 ms. If an anomaly of the yaw rate sensor is determined in the anomaly determination process of step 206 in a certain cycle, the value of fail counter CNT will be set to the maximum 167, and that the yaw rate sensor is abnormal is determined in step 214. When the determination of anomaly in step 206 continues in repetitions of this process cycle thereafter, the value of fail counter CNT is kept at 167. On the other hand, if the normality determination process in step 207 results in determining that the yaw rate sensor is normal, the value of fail counter CNT will be decreased by "1."

If after an anomaly decision 167 normal decisions are continuously made in step 207, the value of fail counter CNT will reach zero accordingly. Further continuation of normal decision will maintain the value of fail counter CNT zero. This means that if continuous normal decisions are made during the period of 6 ms×167 (about 1 sec) after an anomaly decision the value of fail counter CNT will become zero and step 213 will result in determining that the yaw rate sensor is normal.

If an anomaly decision is made in step 206 when the value of fail counter CNT is smaller than 167, the value of fail counter CNT will be set to the maximum 167, regardless of the value at that time.

As described above, the yaw-rate-sensor's anomaly detecting apparatus of the present embodiment is arranged so that one anomaly decision results in immediately determining that the yaw rate sensor is abnormal and so that once the anomaly decision is made, the return to normal will be allowed only if the normal state is maintained over about one second.

When the yaw-rate-sensor's anomaly detecting apparatus determines that the yaw rate sensor is normal, the rear wheel angle control apparatus calculates the rear wheel target angle δr* based on Eq. (1) or Eq. (3) described above; when the apparatus determines that the yaw rate sensor is abnormal, the rear wheel angle control apparatus calculates the rear wheel target angle δr* based on Eq. (2) described above. Then the rear wheel angle control apparatus controls the actuator 100 so that the real rear wheel angle br agrees with the rear wheel target angle δr*.

The road-surface-condition determination process to determine the degree of bad road will be described below using the flowchart shown in FIG. 8. This process routine is carried out every 24 ms by the ECU 1, and the result thereof, on or off of the bad road determination flag, is us ed in step 202 of the yaw rate anomaly determination process of FIG. 7.

First, step 301 is a step to carry out the bad road determination process. Specifically, a road of interest is determined to be a bad road if either Eq. (4) or Eq. (5) below is satisfied.

$$Gwr \geq 1.5G \qquad (4)$$

$$Gwl \geq 1.5G \qquad (5)$$

In the equations, Gwr is the acceleration of the right wheel, Gwl the acceleration of the left wheel, and G the acceleration of gravity.

The accelerations Gwr and Gwl are calculated from the left and right wheel speeds v1, v2, respectively, as follows.

$$Gwr = |v2(n-1) - v2(n)|$$

$$Gwl = |v1(n-1) - v1(n)|$$

Here, v2(n) is a value of right wheel speed at this time and v2(n−1) is a value of right wheel speed at a previous time, i.e., 24 ms before. Similarly, v1(n) is a value of left wheel speed at this time and v1(n−1) is a value of left wheel speed at a previous time, i.e., 24 ms before.

In ordinary driving the wheel acceleration during running on a good road is approximately 0.5 G for the both left and right wheels. On the other hand, during running on a bad road the idler wheels can be suddenly decelerated or accelerated because of unevenness of road surface. Therefore, instantaneous wheel accelerations over 1.5 G appear relatively frequently. It can be, therefore, said that states satisfying Eq. (4) or Eq. (5) above result from running on a bad road.

When this condition of step 301 is met, i.e., when a decision of bad road is made, the ECU goes to step 302 to first determine whether a current value of bad road determination counter CNTa is smaller than 30. When the bad road determination counter CNTa is smaller than 30, the ECU proceeds to step 305 to set the value of bad road determination counter CNTa to 30.

On the other hand, if the value of the bad road determination counter CNTa is 30 or more, the ECU will proceed to step 304 to determine if the value of bad road determination counter CNTa is the maximum 50. If it is already 50 the ECU will proceed to step 307 to maintain that value. If it is not 50 the ECU will go to step 306 to replace the value with a value obtained by adding 1 to a previous value.

The value of bad road determination counter CNTa is used in order to determine either on or off of the bad road determination flag. As indicated in steps 309 to 311, the bad road determination flag is set off with the count value of 0, whereas the bad road determination flag is set on with values of 1 to 50 inclusive.

When in the bad road determination process of step 301 the condition is not satisfied, a decision of good road is made and the ECU moves to step 303 to determine whether the value of bad road determination counter CNTa is 0. If in this step the value of bad road determination counter CNTa is already 0 the ECU will advance to step 307 to maintain the count value 0 as it is. If the value is not 0, the ECU will advance to step 308 to replace the value with a value obtained by subtracting 1 from a previous value.

After either of steps 305 to 308 is carried out as to the process with the bad road determination counter CNTa, the bad road determination flag is determined by steps 309 to 311. Specifically, as described above, when the value of the bad road determination counter CNTa is zero, the ECU goes to step 310 to set the bad road determination flag off; if it is a value except for 0 the ECU goes to step 311 to set the bad road determination flag on. This bad road determination flag is used for the on/off determination of bad road determination flag in the yaw-rate-sensor's anomaly detecting process routine shown in FIG. 7.

Figures 9A, 9B, 9C:
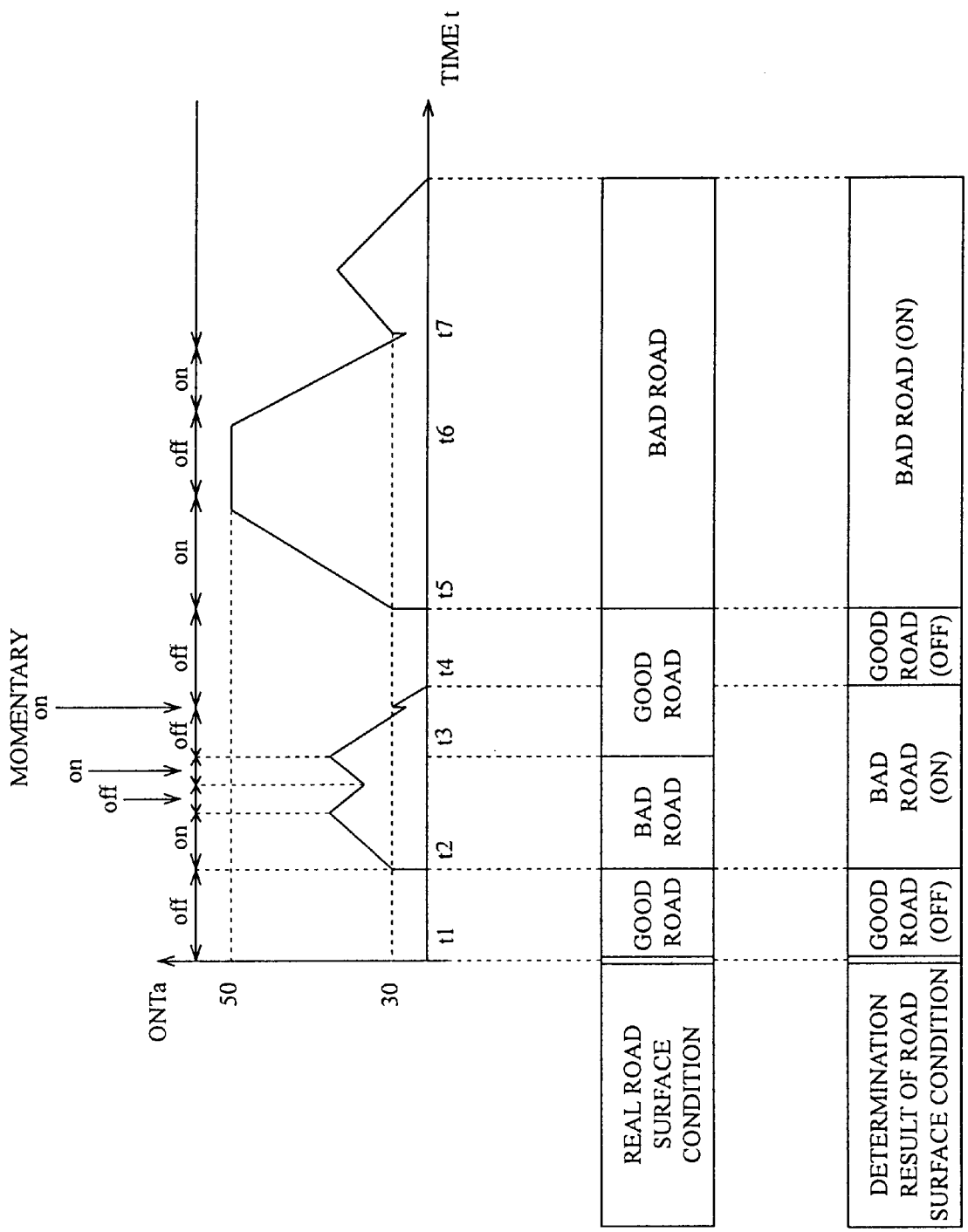
FIGS. 9A–9C are drawings to show an example where the flowchart of FIG. 8 is executed to determine the road surface condition.

FIGS. 9A–9C show an example of relation between determination results by this road-surface-condition determination process and actual road surfaces. FIG. 9A shows temporal change in count value of bad road determination counter CNTa, FIG. 9B actual road surface conditions in that case, and FIG. 9C results of determination of road surface condition. In FIG. 9A ON or OFF corresponds Yes or No in the result of bad road determination of step 301 and does not mean on or off of the bad road determination flag.

At time t1 the value of bad road determination counter CNTa is 0 and it is determined that the vehicle is in running on a good road. When at time t2 running on a bad road starts as shown in FIG. 9B, the condition of step 301 is met and the value of bad road determination counter CNTa is set to 30. As the running on the bad road continues thereafter, values of bad road determination counter CNTa gradually increase. Before time t3 there is a period in which an erroneous decision of good road is made in spite of the running on the bad road and values of bad road determination counter CNTa decrease. However, the bad road determination flag is maintained on because the values of bad road determination counter CNTa are not 0.

After transition to running on a good road at time t3, the condition of step 301 is not met and values of bad road determination counter CNTa gradually decrease. Before time t4 an erroneous decision of running on a bad road is made for a moment to raise the value of bad road determination counter CNTa to 30. However, the values of bad road determination counter CNTa continue decreasing thereafter and the value of bad road determination counter CNTa reaches 0 at time t4. At this point the bad road determination flag becomes off whereby a decision of running on a good road is made.

After that, the vehicle again starts running on a bad road at time t5. When the condition of step 301 in the road-surface-condition determination process is satisfied, the value of bad road determination counter CNTa is set to 30. After that, the value of bad road determination counter is increased by one every 24 ms. Although during the period from time t6 to time t7 the vehicle is in running on a bad road, the state not satisfying the condition of step 301 continues. This state could occur, depending upon the degree of roughness of bad road and what value is set as the bad road determination threshold of Eqs. (4) and (5). In this example, however, though there is a difference between the actual road surface condition and the determination of step 301, the bad road determination flag is maintained on, because the values of bad road determination counter CNTa are not 0 during that period.

In the road-surface-condition determination process of the present embodiment, as described above, the bad road determination flag is set based on the integration of bad road determination results at every time by making use of the bad road determination counter CNTa. This suppresses the erroneous determination occurring instantaneously, whereby stabilization of determination is achieved.

The bad road determination flag as a consequence of this road-surface-condition determination process is utilized in the setting of the anomaly determination threshold of the yaw rate sensor in step 202 of FIG. 7, as described previously.

In the yaw-rate-sensor's anomaly detecting apparatus of the present embodiment the road surface conditions are classified under the two states of bad road and good road and the anomaly determination threshold of yaw rate sensor is either one of the two values $\alpha 1$, $\alpha 2$ corresponding to the respective states; more accurate anomaly detection can be realized by more finely classifying the road surface conditions, preparing many anomaly determination thresholds of yaw rate sensor according to the classifications, and properly switching these values.

The present embodiment employs the bad road determination based on the left and right wheel accelerations, but various methods can be contemplated therefor without having to be limited to the above example. For example, the bad road determination may be made based on up and down accelerations of the body.

As detailed above, the yaw-rate-sensor's anomaly detecting apparatus of the present invention is free of the erroneous detection of anomaly and failure in detection of anomaly, because the different anomaly determination thresholds of yaw rate sensor are used between during running on a bad road and during running on a good road.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A yaw-rate-sensor's anomaly detecting apparatus for detecting an anomaly of a yaw rate sensor mounted on a vehicle, comprising:
   road-surface-condition determining means for determining a road surface condition; and
   yaw-rate-sensor's anomaly determining means for determining that the yaw rate sensor is abnormal, when a change amount of yaw rate outputted from said yaw rate sensor exceeds an anomaly determination threshold,
   wherein said yaw-rate-sensor's anomaly determining means sets one of different anomaly determination thresholds according to determination results of said road-surface-condition determining means.

2. The yaw-rate-sensor's anomaly detecting apparatus according to claim 1, wherein said road-surface-condition determining means determines a degree of bad road and said yaw-rate-sensor's anomaly determining means sets larger one of said anomaly determination thresholds as said degree of bad road becomes greater.

3. The yaw-rate-sensor's anomaly detecting apparatus according to claim 1, wherein said road-surface-condition determining means is means for determining whether a road is a bad road or a good road, and an anomaly determination threshold set on the occasion of determination of bad road by said yaw-rate-sensor's anomaly determining means is larger than that on the occasion of determination of good road.

4. The yaw-rate-sensor's anomaly detecting apparatus according to claim 1, wherein said road-surface-condition determining means determines a road surface condition, based on wheel acceleration of idler wheels of said vehicle.

5. The yaw-rate-sensor's anomaly detecting apparatus according to claim 4, wherein said road-surface-condition determining means determines that a road surface is of a bad road, when the wheel acceleration of the idler wheels of said vehicle is not less than a predetermined value.

6. The yaw-rate-sensor's anomaly detecting apparatus according to claim 1, wherein said road-surface-condition determining means determines a road surface condition, based on up and down acceleration of said vehicle.

7. A vehicle comprising a yaw rate sensor and a yaw-rate-sensor's anomaly detecting apparatus for detecting an anomaly of said yaw rate sensor, said yaw-rate-sensor's anomaly detecting apparatus comprising road-surface-condition determining means for determining a road surface condition; and yaw-rate-sensor's anomaly determining means for determining that the yaw rate sensor is abnormal, when a change amount of yaw rate outputted from said yaw rate sensor exceeds an anomaly determination threshold, wherein said yaw-rate-sensor's anomaly determining means sets one of different anomaly determination thresholds according to determination results of said road surface condition determining means.

8. The vehicle according to claim 7, wherein the yaw rate outputted from said yaw rate sensor is used one of parameters for rear wheel steering turn control.

* * * * *